United States Patent [19]

Klaschka

[11] Patent Number: 5,579,203
[45] Date of Patent: Nov. 26, 1996

[54] COVER ARRANGEMENT FOR ELECTROLYTIC CAPACITORS

[76] Inventor: Rudolf Klaschka, Tannenweg 9, D-79793 Wutöschingen, Germany

[21] Appl. No.: 373,025

[22] Filed: Jan. 17, 1995

[30] Foreign Application Priority Data

Jan. 15, 1994 [DE] Germany .............................. 44 01 034.6

[51] Int. Cl.⁶ .................... H01G 9/00; H01G 9/10
[52] U.S. Cl. ................. 361/519; 361/518; 361/520; 361/538; 429/174; 429/175; 29/25.41
[58] Field of Search ...................... 361/518, 519, 361/520, 521, 538; 429/174, 175; 29/25.41

[56] References Cited

U.S. PATENT DOCUMENTS

| | | | |
|---|---|---|---|
| 3,091,656 | 5/1963 | Lamoureaux, Jr. | 174/52 |
| 3,548,264 | 12/1970 | Carino et al. | 317/230 |
| 4,114,244 | 9/1978 | Klaschka | 29/25.41 |
| 4,433,361 | 2/1984 | Wolf et al. | 361/519 |
| 4,514,788 | 4/1985 | Klaschka et al. | 361/519 |
| 4,566,606 | 1/1986 | Wolf et al. | 220/626 |

FOREIGN PATENT DOCUMENTS

| | | |
|---|---|---|
| 0065021 | 11/1982 | European Pat. Off. . |
| 1011496 | 11/1956 | Germany . |
| 2645323 | 4/1978 | Germany . |
| 3300815 | 9/1983 | Germany . |

*Primary Examiner*—Leo P. Picard
*Assistant Examiner*—Anthony Dinkins
*Attorney, Agent, or Firm*—Flynn, Thiel, Boutell & Tanis, P.C.

[57] ABSTRACT

A cover arrangement is intended for the pressure-tight closure of a capacitor can for electrolytic capacitors. The cover arrangement contains a cover part having at least one aperture, at least one connecting element inserted into the aperture in the cover part, and a valve element inserted into a further aperture in the cover part in a gas-tight manner. In order to produce a temperature-resistant and chemically-resistant cover arrangement which is of simple construction and can thus be produced cost-effectively, the cover part has a hard-paper core coated externally with respect to the can with an elastomerically flexible sealing layer and internally with respect to the can with a chemically resistant material layer. An elastomeric molding is arranged on the inside of the cover part which has at least one aperture aligned with each aperture in the cover part. The connecting element and the valve element each have an external circumferential collar and an internal circumferential collar which are pressed with the external sealing layer and the internal molding therebetween in an axially force-fitting manner.

17 Claims, 5 Drawing Sheets

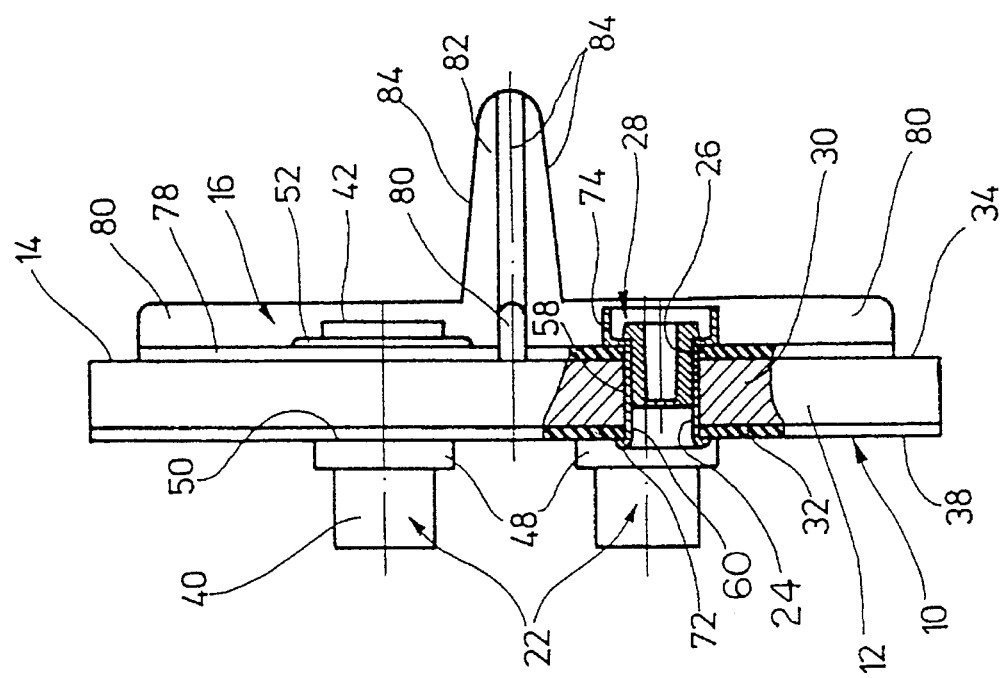
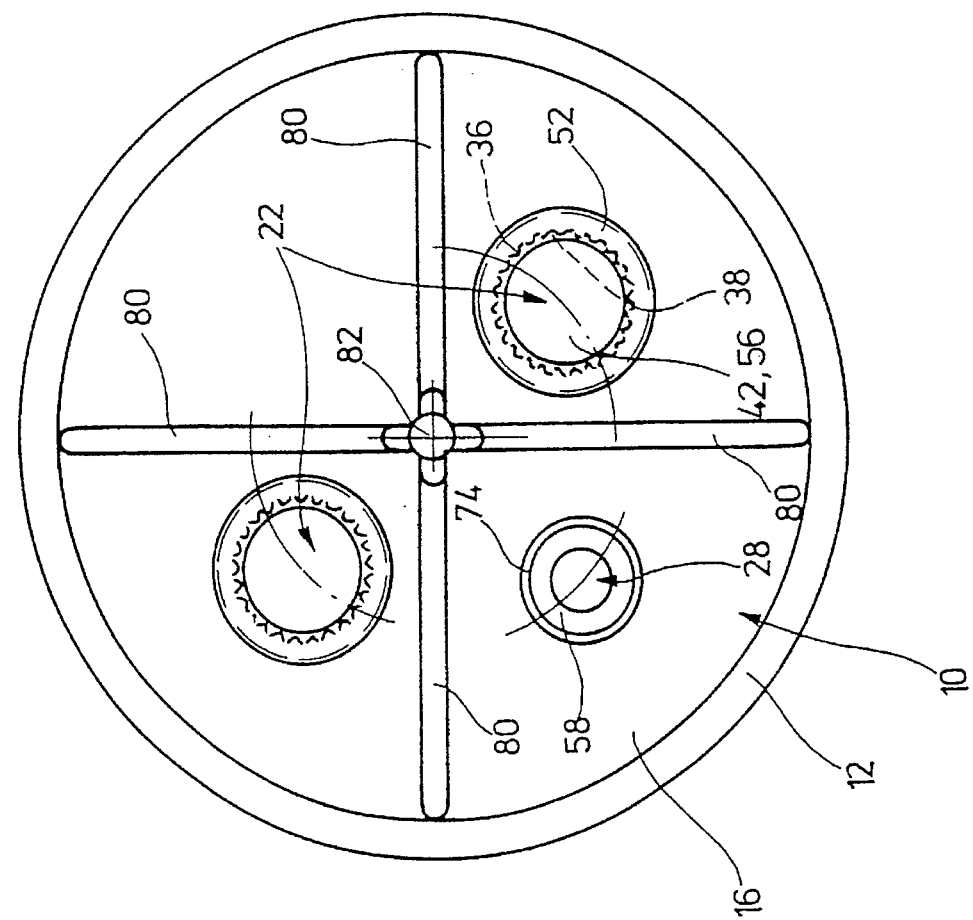
Fig. 1b
Fig. 1a

COVER ARRANGEMENT FOR ELECTROLYTIC CAPACITORS

FIELD OF THE INVENTION

The invention relates to a cover arrangement for a pressure-tight closure of a capacitor can for electrolytic capacitors having a cover part which has at least one aperture and at least one metallic connecting element inserted into each corresponding aperture in the cover part. The connecting element has an outer connection projecting beyond the outer surface of the cover part, has an inner connection projecting beyond the inner surface of the cover part and has a shaft which is connected between the outer connection and the inner connection and passes through the aperture in a gas-tight manner such that it cannot rotate. In place of or in combination with the connecting element, the cover part has a valve element which also can be inserted into an aperture of the cover part in a gas-tight manner.

BACKGROUND OF THE RELATED ART

In the case of capacitor covers of this type, generally two connecting elements passing through the cover are provided for electrical connection to electrodes of a capacitor winding located in the capacitor can. The connecting elements normally pass through apertures in the cover from the inside to the outside and are anchored within the cover part in a positive locking and force-fitting manner. As a result of the different thermal coefficients of expansion of metal and plastic as well as the frequently inadequate rotation protection of the connecting elements when seated in the apertures, there is a risk of the connecting elements becoming loose and as a result, leaks may develop in the aperture area.

In addition, in order to accommodate a valve element, which is generally formed of elastomeric material, an additional aperture is provided in the cover part which has a smooth wall surface in order to ensure adequate gas-tightness. Previously, in order to ensure the desired gas-tightness, the cover parts generally were produced as plastic moldings of relatively costly design. However, the known cover parts of this type are inadequate with respect to the thermal load capacity as well as the desired mechanical and chemical characteristics. Furthermore, it is known in the case of electrolytic capacitors, to make the cover parts of coated hard-paper material. These covers are distinguished by a relatively high temperature resistance. The connecting elements were engaged within the apertures in a manner similar to simple riveted connections. However, rotation protection could not be ensured in this way. In addition, no valve elements could be accommodated in these cover parts.

In view thereof, the invention is based on the object of developing a cover arrangement of the aforementioned type which, despite a simple construction of the cover part, provides rotation-protected and gas-tight fitting of the connecting elements and valve elements within the apertures and provides a good load capacity and resistance, both from the mechanical and the chemical viewpoints.

SUMMARY OF THE INVENTION

The combinations of the features recited by the Patent claims 1 and 3 are provided in order to achieve the objects of the invention. Advantageous refinements and developments of the invention are further recited in the dependent claims.

In particular, the solution according to the invention is based on the idea that a pressure-tight can closure can be formed by means of a cover part with a hard-paper core having suitable attachments or fittings or by means of an elastomeric cover part which closure complies with the stringent requirements relating to mechanical and chemical resistance, rotation protection of the connecting elements and placement of a valve element. In order to achieve this, a first embodiment of the invention comprises a cover part that has a hard-paper core which is coated externally with respect to the can with an elastomerically flexible sealing layer and internally with respect to the can with a chemically resistant material layer wherein an elastomeric molding is arranged internally with respect to the can and is provided with at least one aperture which is aligned with an aperture in the cover part. A connecting element and/or a valve element fit through the aligned apertures corresponding thereto and have an external circumferential collar and internal circumferential collar wherein the collars press the sealing layer and the molding therebetween in an axially force-fitting manner such that the aperture is sealed in a gas-tight manner. According to a preferred feature of the embodiment, the cover part and the molding rest flat against one another and each have a plurality of apertures which are aligned with one another for receiving the connection elements and/or valve elements.

A second embodiment of the invention provides that the cover part is composed of an elastomeric material and that the connecting element and/or the valve element have external circumferential and internal circumferential collars which press outer and inner surfaces of the elastically flexible cover therebetween in an axially force-fitting manner. In order to improve the rotation protection, the shaft of the connecting element can have a circumferential tooth system on an outer surface thereof extending over at least a part of its length. The aperture in the cover part and/or in the molding has a cooperating inner surface having an internal tooth system which is complementary to the circumferential tooth system of the shaft. Particularly good retention which protects against rotation is achieved if the circumferential tooth system of the shaft and the internal tooth system of the aperture wall each have 10 to 36, preferably 20 to 30, teeth, depending on the shaft diameter, which are wave-shaped and are arranged over the circumference.

In order to clamp the connecting element in a force-fitting manner to the cover part, it is particularly advantageous if the shaft is flanged radially about the side of the inner connection to form the internal collar. The shaft is flanged preferably by peeling off shaft material which is then pressed axially against the molding and/or the elastically flexible inner surface of the cover to draw the external collar against the external sealing layer or the elastically flexible outer surface of the cover.

A further embodiment of the invention provides that the valve element has a metallic valve support with a sleeve part which passes through the corresponding aperture in the cover part and is provided with an external collar and an internal collar. The valve element also has an elastomeric valve member which is inserted into the sleeve part in a gas-tight manner. The sleeve part is preferably designed as an extrusion-molded part made of aluminum and is produced with a sufficiently smooth inner surface which ensures that the valve member is in contact in a gas-tight manner when latched into the sleeve part. This would not be the case if the valve member were inserted directly into the aperture in the cover part, since it is impossible to incorporate a sufficiently smooth hole in the hard-paper material of the cover part. An adequate seal of the valve support in the aperture in the cover part, however, can be provided wherein the internal collar of the sleeve part is pressed against the elastomeric molding like a hollow rivet while the flanged-over outer edge which forms the external collar of the sleeve part is pressed against the elastomeric sealing layer of the cover part. In order to ensure that the valve member always communicates with the gas space in the capacitor can and is not closed against the access of gas by fittings such as the capacitor winding, a ring attachment or centering attachment projects internally from the sleeve part so as to serve a separation-maintaining function. The centering attachment projects centrally over the cover part and is dimensioned such that it can be inserted into the central winding opening so as to be supported on the outer edge of the winding opening.

The same result can be achieved by providing the molding with spacer ribs projecting inwards on the side facing away from the cover part and/or having a centering attachment which similarly projects inwards. The spacer ribs, which are supported on the end edge of the capacitor winding, are in this case preferably arranged at an angular interval from one another and aligned essentially radially. The centering attachment must be arranged centrally on the molding in order to be able to insert it into the winding opening.

The chemically resistant material layer on the inner surface of the cover part preferably is composed of polyfluorotetraethylene. Since the molding also comes into contact with the capacitor electrolyte, it should be composed of a chemically resistant but elastomeric material, for example of hard rubber or silicone rubber or of an elastomeric plastic. In principle, it is possible for the molding to be coated internally onto the hard-paper core as a chemically resistant material layer. Due to the complicated geometrical shape, the molding preferably is produced as a single-component or multi-component injection-molded part.

BRIEF DESCRIPTION OF THE DRAWINGS

The invention is explained in more detail in the following text with reference to the preferred embodiments which are illustrated in a schematic manner in the drawings, and in which:

FIGS. 1a and 1b show a rear view and a partially cut-away side view of a capacitor cover having two metallic connecting elements, one valve element and one internal elastomeric molding;

FIGS. 2a and 2b show a rear view of a modified capacitor cover as well as a sectional view thereof in the direction of the section line II—II in FIG. 2a;

FIGS. 3a and 3b show a rear view of a modified capacitor cover and a sectional view thereof in the direction of the section line III—III in FIG. 3a;

FIGS. 4a and 4b show a detail from a rear view of a further modified capacitor cover and a sectional view thereof in the direction of the section line IV—IV in FIG. 4a;

FIGS. 5a and 5b show a detail from a rear view of a capacitor cover which is modified from that seen in FIGS. 4a and 4b and a sectional view thereof in the direction of the section line V—V in FIG. 5a.

DESCRIPTION OF THE PREFERRED EMBODIMENTS

Figure 2B:
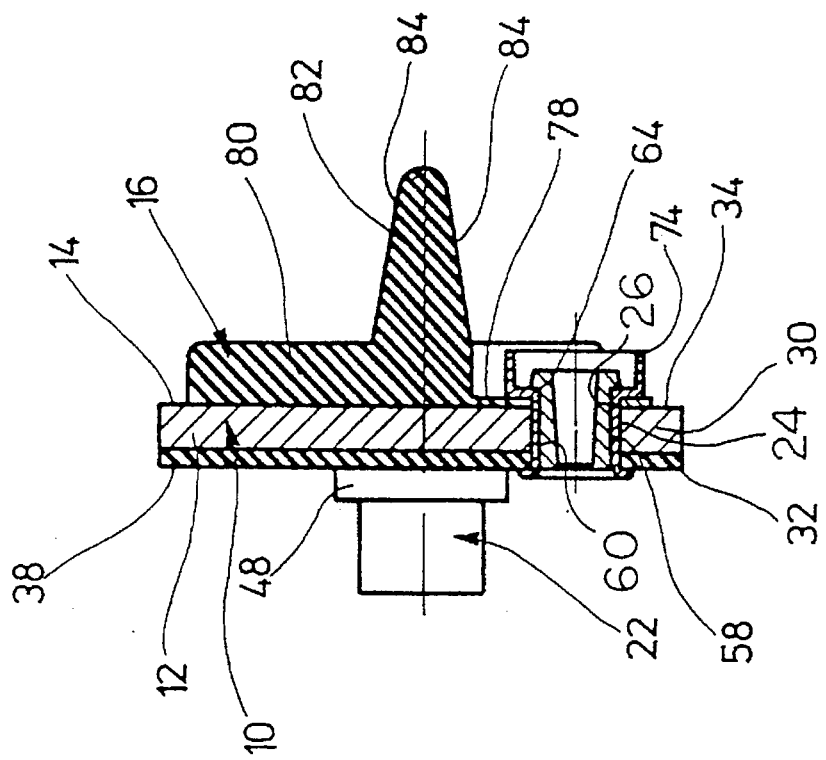
Figure 2A:
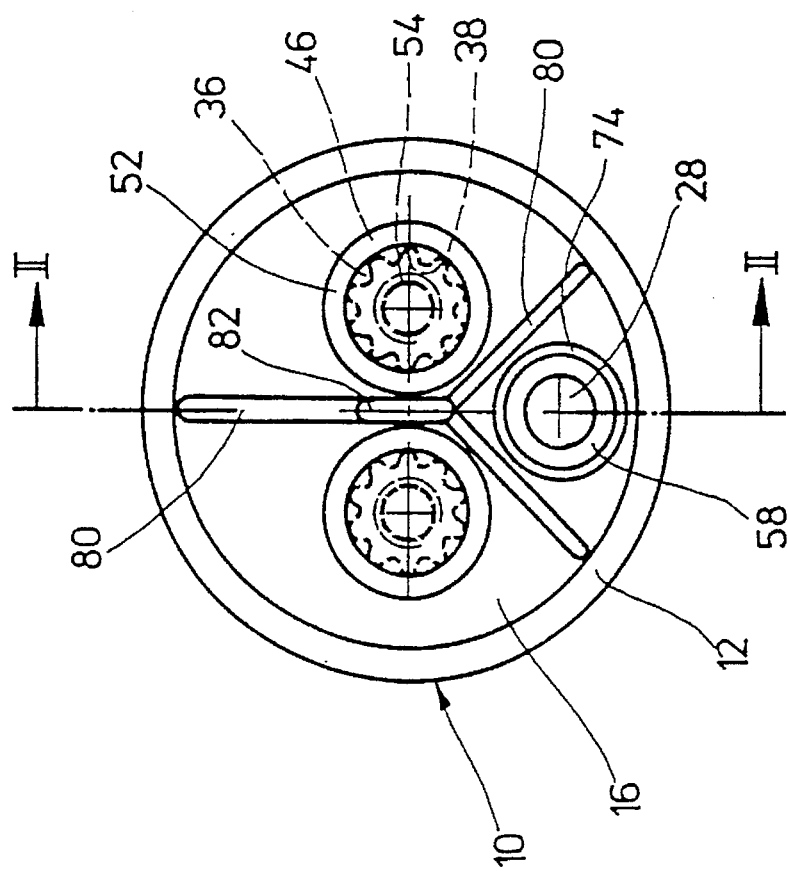
Figure 3B:
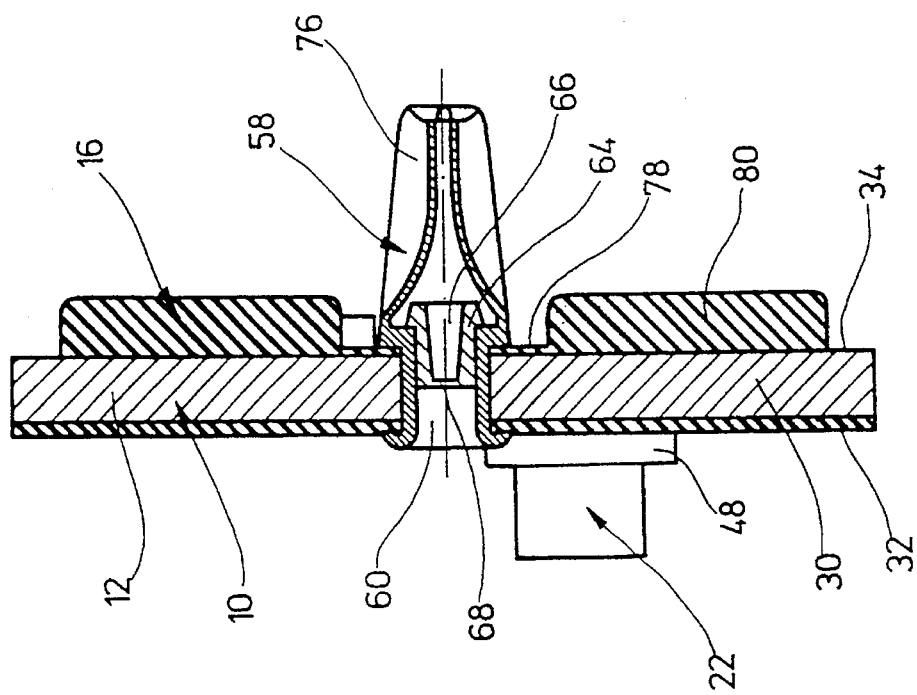
Figure 3A:
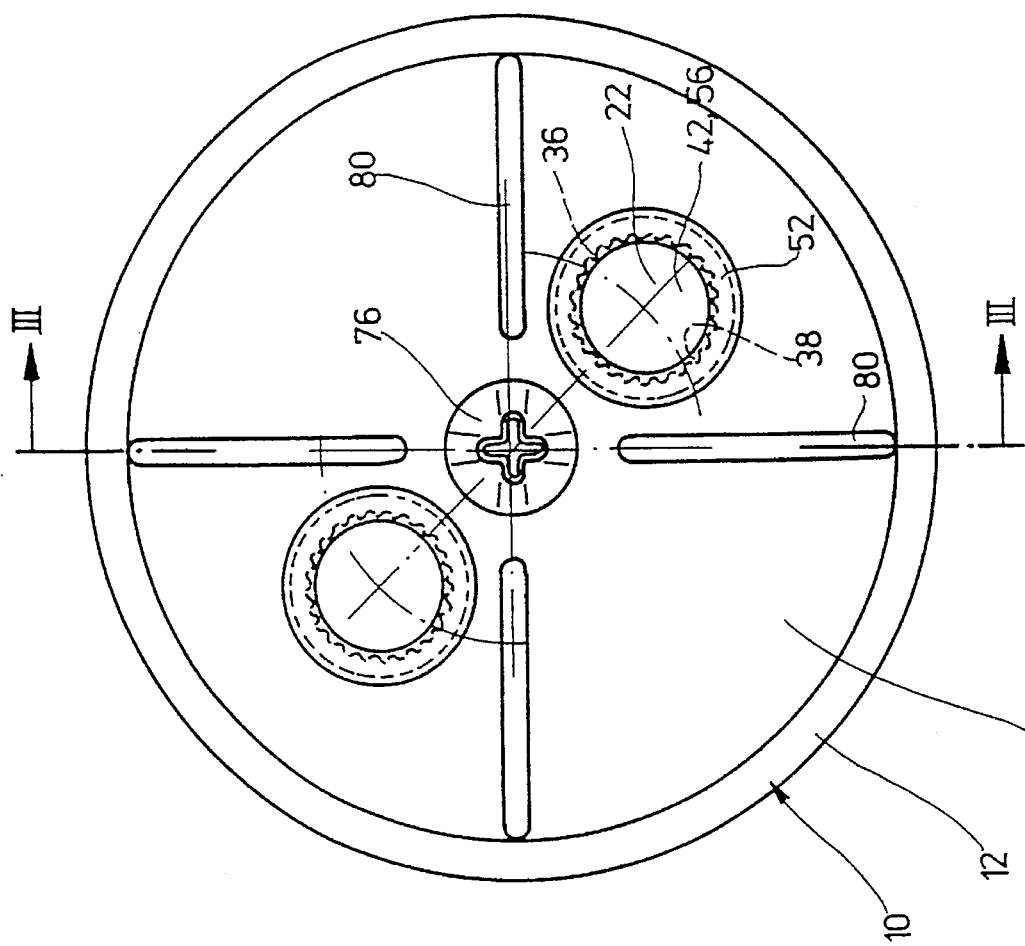

Referring generally to FIGS. 1a, 1b, 4a and 4b, the capacitor covers 10 of the invention which are illustrated in the drawings are intended for the pressure-tight closure of a capacitor can for electrolytic capacitors (not illustrated). The covers 10 essentially comprise a cover part 12, at least one molding 16 which rests flat against an inner surface 14 of the cover part 12, two connecting elements 22 which are each inserted from the outside of the can (not illustrated) into aligned pairs of apertures 18, 20 through the cover part 12 and the molding 16 respectively and are each anchored therein in a positive locking and force-fitting manner, and a valve element 28 which is inserted from the inside into an aligned pair of apertures 24, 26 through the cover part 12 and the molding 16 respectively and is anchored therein in a positive locking and force-fitting manner.

The cover part 12 has a hard-paper core 30 which is coated externally with a sealing layer 32 made of elastomeric material and is coated on the inner surface 14 with a chemically resistant thin material layer 34 preferably made of polyfluorotetraethylene. The cover part 12 is stamped out from a plate material which is prefabricated as a semi-finished product. During or after the stamping process, each of the apertures 18 for the connecting elements 22 as well as the aperture 24 for the valve element 28 are stamped out or drilled wherein the apertures 18 are provided with a wavy internal tooth system 36 while the aperture 24 forms a cylindrical passage.

The connecting elements 22 are produced using the extrusion-molding method so as to have an outer connection 40 which projects beyond an outer surface 38 of the cover part, an inner connection 42 which projects beyond the inner surface 14, and a shaft 44 which connects the outer connection 40 and the inner connection 42 to one another and passes through the relevant aperture 18. To protect each of the connecting elements 22 from rotating, the shaft 44 has a wavy or wedge-shaped circumferential tooth system 46 complementary to the internal tooth system 36 of the associated aperture 18. The circumferential tooth system 46 is formed with 10 to 36 teeth, preferably 20 to 30 teeth, which engage with the internal tooth system 36 and provide the rotation protection for the connecting element 22.

Figure 4A:
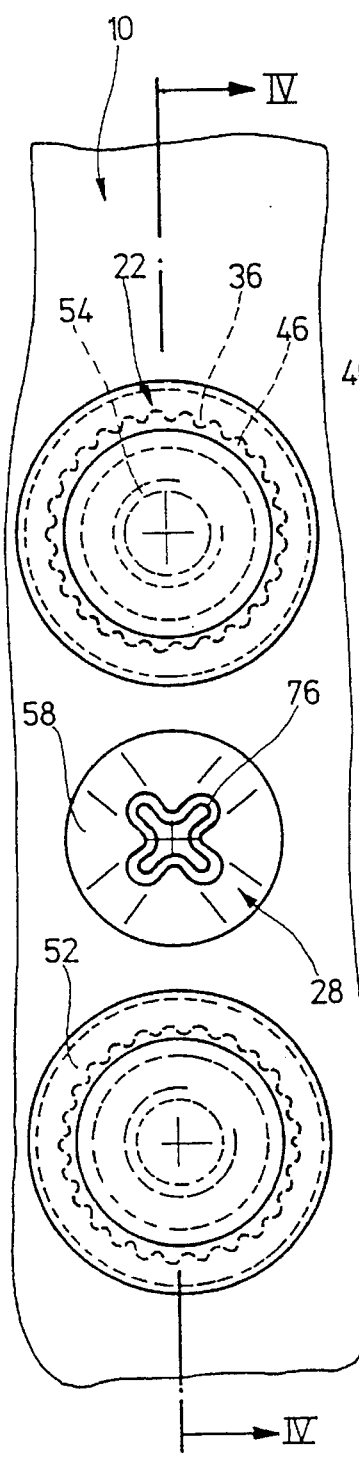
Figure 4B:
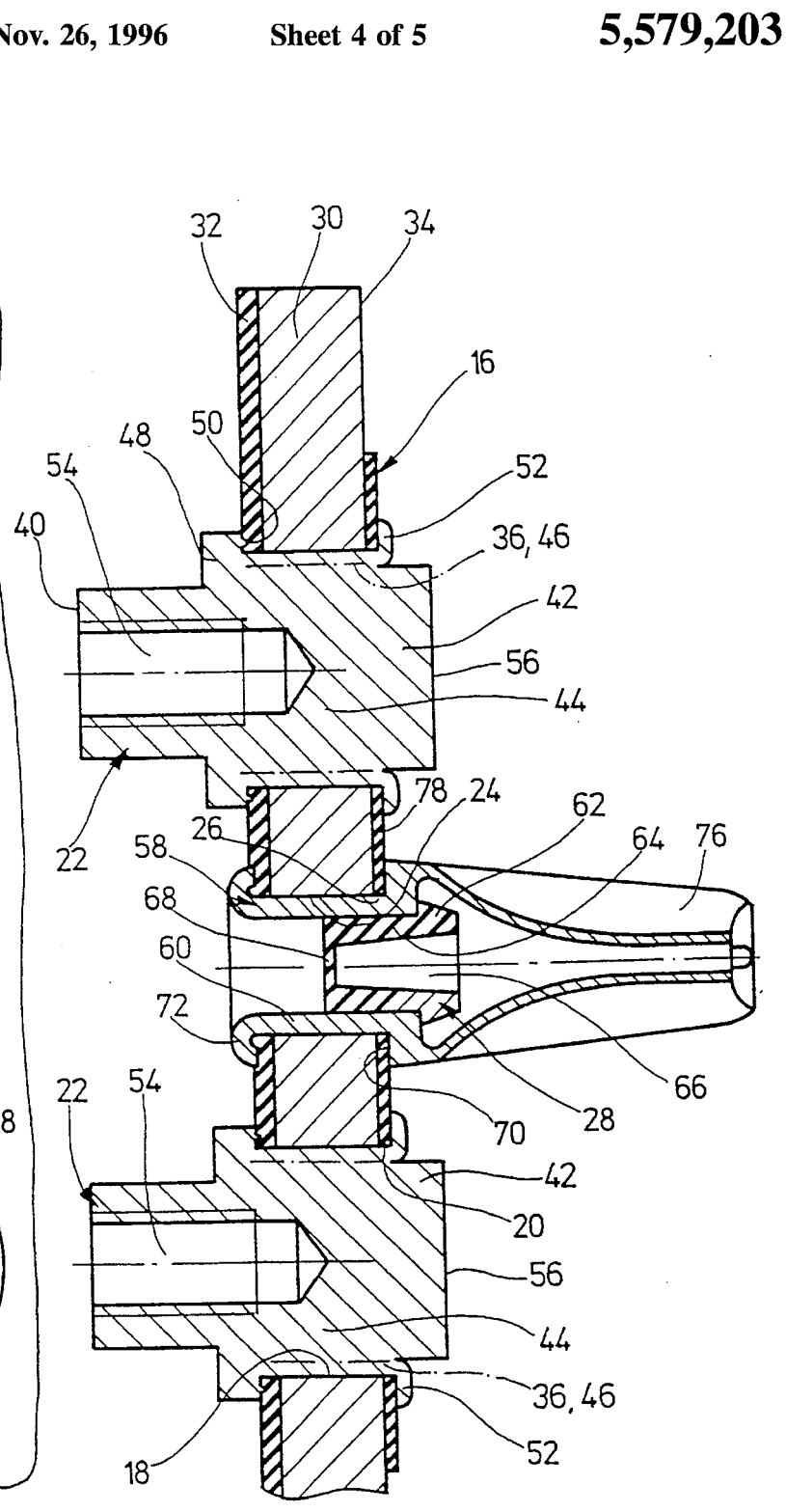

As can be seen in the embodiment of FIG. 4b, the connecting elements 22 each are inserted into the apertures 18, 20 through the outer surface 38 until an inner shoulder 50 of their external circumferential collar 48 abuts against the sealing layer 32 in the edge region of the aperture 18. To secure the connecting element 22 in position, material is then peeled off the shaft 44 toward the inner surface 14 using a suitable annular peeling and stamping tool having a wedge-shaped cross-section. The peeled material thereafter is pressed against the inner surface 14 of the elastomeric molding 16 in the edge region of the aperture 20 to form an annular flange or internal circumferential collar 52. At the same time, the inner shoulder 50 of the connecting element 22 is drawn toward the outer surface 38 such that the connecting element 22 is pressed against the elastomeric sealing layer 32.

The connecting elements 22 are provided within their outer connections 40 with an axial internal thread 54 for the mechanical connection or DC-electrical connection of an external electrical conductor (not illustrated). The inner connection 42 has a contact surface 56 or at least one contact pin (not illustrated) for the connection of the contact tabs of a capacitor winding (not illustrated).

The valve element 28 comprises a metallic valve support 58 which is preferably produced using the extrusion-molding method and is preferably made of aluminum, and a valve member 64 which is inserted into a sleeve part 60 of the valve support 58 in a gas-tight manner and is anchored therein in a positive locking manner such that a latching head 62 thereof abuts against the valve support 58. The valve member 64 includes a valve membrane 68, which communicates via a cavity 66 with the interior of the capacitor can (not illustrated), is dimensioned such that it tears if a predetermined overpressure in the capacitor can is exceeded. Consequently, the valve membrane 68 produces pressure equalization with the exterior of the can.

To secure the valve element 28 to the cover 10, the sleeve part 60 of the valve support 58 is pushed from the cover interior through the apertures 24, 26 until an annular shoulder or internal circumferential collar 70 thereof abuts against the molding 16 in the region of the edge of the aperture 26 and an outwardly projecting edge or external circumferential collar 72 flanges over and is pressed against the sealing layer 32 in a gas-tight manner. The valve member 64 is subsequently inserted from the outside of the can (not illustrated) into the sleeve part 60 and latched therein by the latching head 62.

In the case of the alternative embodiments shown in FIGS. 1a, 1b, 2a and 2b for small capacitor covers, the apertures 24, 26 for the valve element 28 preferably are eccentrically arranged on the cover part 12. As illustrated thereby, the valve support 58 has a short annular attachment 74 which projects on the inside of the sleeve part 60 to ensure that the capacitor winding (not illustrated) cannot press against the inwardly projecting elastomeric valve member 64 and close it.

In the case of the embodiments which are shown in FIGS. 3a and 3b and 4a and 4b, the apertures 24, 26 for the valve element 28 are arranged centrally. This arrangement is preferable in the case of relatively large capacitor covers having a sufficient distance between the connecting elements 22. In this case, the valve support 58 has a centering attachment 76 projecting inwards into the can (not illustrated), like a pin, which can be inserted into a central opening (not illustrated) in the capacitor winding and supported therein in a centering manner by means of the edge regions of its oblique flanks.

In the case of the embodiment shown in FIGS. 4a and 4b, the molding 16 is constructed as a flat disc which is provided with the apertures 20 and the central aperture 26 and can be stamped out of a suitable semi-finished product foil. In principle, individual sealing rings (not illustrated) also can be used as moldings 16, instead of the flat disc.

Figure 5A:
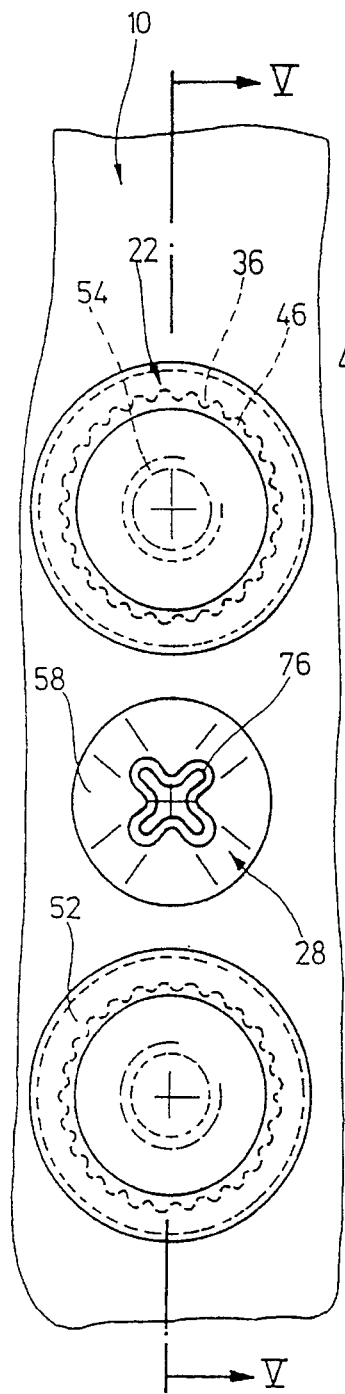
Figure 5B:
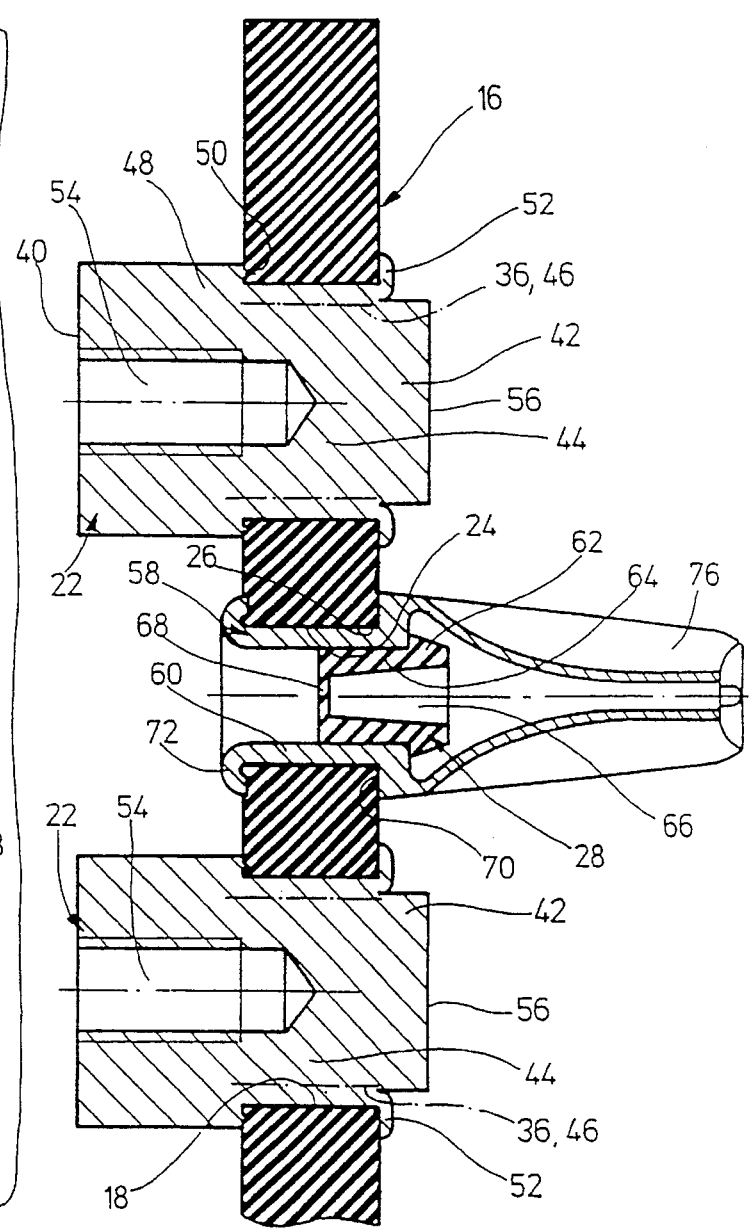

In the case of the alternative embodiment according to FIGS. 5a and 5b, the cover part 12 is produced from a continuous material which is elastomeric and at the same time chemically resistant so that it does not require the additional use of an elastomeric molding 16. In addition, an alternative molding (not illustrated) is formed like a grid and is made of stiff material so that when provided on the inside of the cover part 12, the grid-like molding serves a separation-maintaining function similar to the function of spacer ribs 80 in FIGS. 3a and 3b discussed more fully herein.

In the exemplary embodiments of FIGS. 1a, 1b, 2a, 2b, 3a and 3b, the molding 16 is constructed as an injection-molded part which has a thin-walled region 78 having the apertures 20, 26 formed therein, and has a plurality of the aforesaid spacer ribs 80 which are arranged at an angular interval from one another. The ribs 80 project a predetermined distance beyond the region 78 and are aligned essentially along a radial direction. The ribs 80 are supported on an adjacent end surface of the capacitor winding (not illustrated) and thus form an elastically flexible spacer. In addition, in the preferred embodiments for small capacitors shown in FIGS. 1a, 1b and 2a, 2b, a central centering attachment 82 is integrally formed on the molding 16 and is engage within the central winding opening in the capacitor winding when in the assembled state. The centering attachment 82 is supported therein in a centering manner by means of its oblique outer edges 84.

In summary, the following can be stated: the invention relates to a cover arrangement which is intended for pressure-tight closure of a capacitor can for electrolytic capacitors. The cover arrangement contains a cover part 12 having at least one aperture 18, 20 formed therethrough, at least one connecting element 22, which can be inserted within the aperture 18 in the cover part 12, and a valve element 28 which can be inserted into a further aperture 24 in the cover part 12 in a gas-tight manner. In order to produce a temperature-resistant and chemically-resistant cover arrangement which is of simple construction and thus can be produced cost-effectively, the cover part 12 has a hard-paper core 30 coated externally with respect to the can (not illustrated) with an elastomerically flexible sealing layer 32 and internally with respect to the can (not illustrated) with a chemically resistant material layer 34. An elastomeric molding 16 is arranged on the inner surface 14 of the cover part 12 which preferably has at least one of each of the apertures 20 or 26 formed therethrough which are aligned with at least one of the respective apertures 18 or 24 in the cover part 12. The connecting element 22 and the valve element 28 each have external and internal circumferential collars which press the external sealing layer 32 and the internal molding 16 therebetween in an axially force-fitting manner.

We claim:

1. In a cover arrangement for the pressure-tight closure of a capacitor can for electrolytic capacitors having a cover part which has at least one aperture, and having at least one element which is one of a metallic connecting element and a valve element which is inserted into the aperture in the cover part, said connecting element having an outer connection projecting beyond an outer surface of the cover part, an inner connection projecting beyond an inner surface of the cover part and a shaft located between the outer connection and the inner connection and passing through the aperture in a gas-tight manner such that it cannot rotate, the improvement comprising the cover part having a hard-paper core which is coated externally with respect to the capacitor can with an elastomerically flexible sealing layer and internally with respect to the capacitor can with a chemically resistant material layer, wherein the cover part has an elastomeric molding arranged internally which has at least one aperture which is aligned with the aperture in the cover part, and wherein the element has an external circumferential collar and an internal circumferential collar pressed against the external sealing layer and the internal molding respectively therebetween in an axially force-fitting manner.

2. The cover arrangement according to claim 1, wherein the cover part and the molding rest flat against one another and have a plurality of said apertures which are aligned with one another for receiving elements.

3. The cover arrangement according to claim 1, wherein the molding has a centrally projecting centering attachment on a side thereof facing away from the cover part.

4. The cover arrangement according to claim 1, wherein the chemically resistant material layer is composed of polyfluorotetraethylene.

5. The cover arrangement according to claim 1, wherein the molding arranged on the cover part is composed of a chemically resistant elastomeric material and wherein the chemically resistant elastomeric material is hard rubber, silicone rubber or an elastomeric plastic.

6. The cover arrangement according to claim 1, wherein the molding is coated on the cover part internally to form the chemically resistant material layer on the hard-paper core.

7. The cover arrangement according to claim 1, wherein the molding is constructed as an injection-molded part.

8. The cover arrangement according to claim 1, wherein the shaft of the connecting element has a wavy circumferential tooth system extending over at least a part of its length, and the aperture in at least one of the cover part and in the molding has an inner surface having an internal tooth system complementary to the circumferential tooth system of the shaft.

9. The cover arrangement according to claim 8, wherein the circumferential tooth system of the shaft and the internal tooth system of the aperture wall have 10 to 36 teeth which are distributed over the circumference.

10. The cover arrangement according to claim 1, wherein the valve element has a metallic valve support with a sleeve part which passes through the aperture in the cover part and the aperture in the molding and is provided with the external collar and the internal collar and said valve element has an elastomeric valve member which is inserted into the sleeve part in a gas-tight manner.

11. The cover arrangement according to claim 10, wherein the internal collar of the sleeve part is pressed against the molding like a hollow rivet and a flanged-over outer edge which forms the external collar of the sleeve part is pressed against the sealing layer.

12. The cover arrangement according to claim 10, wherein a ring attachment or centering attachment projects internally on the sleeve part.

13. The cover arrangement according to claim 10, wherein the valve support is constructed with its sleeve part as an extrusion-molded part made of aluminum.

14. The cover arrangement according to claim 1, wherein the molding has projecting spacer ribs on a side thereof facing away from the cover part.

15. The cover arrangement according to claim 14, wherein the spacer ribs are arranged at an angular interval from one another and are aligned essentially radially.

16. In a cover arrangement for the pressure-tight closure of a capacitor can for electrolytic capacitors having a cover part which has at least one aperture, and having at least one element which is one of a metallic connecting element and a valve element which is inserted into the aperture in the cover part, said connecting element having an outer connection projecting beyond an outer surface of the cover part, having an inner connection projecting beyond an inner surface of the cover part and having a shaft located between the outer connection and the inner connection passing through the aperture in a gas-tight manner such that the shaft cannot rotate, the improvement comprising the cover part being composed of an elastomeric material wherein the element has an external circumferential collar and an internal circumferential collar pressing the outer and inner surfaces of the elastically flexible cover part therebetween in an axially force-fitting manner.

17. The cover arrangement according to claim 16, wherein the shaft is flanged radially on a side proximate the inner connection to form the internal collar by peeling off shaft material and drawing the external collar against the elastically flexible cover outer surface as the internal collar is pressed axially against the cover inner surface.

* * * * *